United States Patent
Stetson

(10) Patent No.: US 10,341,628 B2
(45) Date of Patent: Jul. 2, 2019

(54) MONOCHROME-COLOR MAPPING USING A MONOCHROMATIC IMAGER AND A COLOR MAP SENSOR

(71) Applicant: Google Inc., Mountain View, CA (US)

(72) Inventor: Philip Sean Stetson, Wexford, PA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/439,882

(22) Filed: Feb. 22, 2017

(65) Prior Publication Data

US 2018/0041742 A1 Feb. 8, 2018

Related U.S. Application Data

(60) Provisional application No. 62/372,143, filed on Aug. 8, 2016.

(51) Int. Cl.
| | |
|---|---|
| H04N 9/43 | (2006.01) |
| H04N 9/04 | (2006.01) |
| H04N 9/07 | (2006.01) |
| G06T 5/50 | (2006.01) |
| G06T 11/00 | (2006.01) |
| H04N 1/46 | (2006.01) |
| H04N 5/225 | (2006.01) |
| H04N 5/232 | (2006.01) |
| H04N 5/33 | (2006.01) |
| H04N 1/40 | (2006.01) |

(52) U.S. Cl.
CPC .............. *H04N 9/43* (2013.01); *G06T 5/50* (2013.01); *G06T 11/001* (2013.01); *H04N 1/40012* (2013.01); *H04N 1/465* (2013.01); *H04N 5/2258* (2013.01); *H04N 5/23232* (2013.01); *H04N 5/332* (2013.01); *H04N 9/045* (2013.01); *H04N 9/07* (2013.01)

(58) Field of Classification Search
CPC ........................................................ H04N 9/43
USPC ........................................................ 348/280
See application file for complete search history.

(56) References Cited

U.S. PATENT DOCUMENTS

| | | | |
|---|---|---|---|
| 5,473,736 A | 12/1995 | Young | |
| 5,534,915 A | 7/1996 | Sandrew | |
| 5,852,502 A * | 12/1998 | Beckett | G11B 27/031 358/512 |
| 6,292,212 B1 | 9/2001 | Zigadlo et al. | |
| 6,477,270 B1 | 11/2002 | Wu | |
| 8,115,825 B2 | 2/2012 | Culbert et al. | |
| 8,711,256 B2 | 4/2014 | Yoshikawa | |

(Continued)

FOREIGN PATENT DOCUMENTS

| | | |
|---|---|---|
| CN | 107707789 | 2/2018 |
| DE | 102017118011 | 2/2018 |
| WO | 2018031288 | 2/2018 |

OTHER PUBLICATIONS

"International Search Report and Written Opinion", PCT Application No. PCT/US2017/044816, dated Nov. 9, 2017, 15 pages.

(Continued)

*Primary Examiner* — Joel W Fosselman
(74) *Attorney, Agent, or Firm* — Colby Nipper PLLC

(57) ABSTRACT

This document describes techniques and apparatuses for implementing monochrome-color mapping using a monochromatic imager and a color map sensor. These techniques and apparatuses enable better resolution, depth of color, or low-light sensitivity than many conventional sensor arrays.

20 Claims, 9 Drawing Sheets

(56) References Cited

U.S. PATENT DOCUMENTS

| 8,724,894 | B1 | 5/2014 | Jensen et al. |
| 2006/0126085 | A1 | 6/2006 | Owen et al. |
| 2013/0335599 | A1 | 12/2013 | Zhang |
| 2014/0267361 | A1 | 9/2014 | McClanahan |
| 2015/0288950 | A1 | 10/2015 | Zhang |

OTHER PUBLICATIONS

"Search and Examination Report", GB Application No. 1712354.8, dated Jan. 29, 2018, 7 pages.
Kylander, et al., "Chapter 27: Color Filters, Sample Colorize", In: "The Gimp: The Official Handbook: The Gimp User's Manual Version 1.01."; The Coriolis Group, LLC, Nov. 1, 1999, 35 pages.
Welsh, et al., "Transferring Color to Greyscale Images", ACM Transactions on Graphics (TOG), ACM, US; vol. 21, No. 3, Jul. 1, 2002, 4 pages.
"Written Opinion", PCT Application No. PCT/US2017/044816, dated Jun. 29, 2018, 8 pages.
"International Preliminary Report on Patentability", PCT Application No. PCT/US2017/044816, dated Sep. 26, 2018, 15 pages.

\* cited by examiner

MONOCHROME-COLOR MAPPING USING A MONOCHROMATIC IMAGER AND A COLOR MAP SENSOR

PRIORITY APPLICATION

This application claims priority under 35 U.S.C. § 119(e) to U.S. Provisional Patent Application Ser. No. 62/372,143, titled "Monochrome-Color Mapping Using a Monochromatic Imager and a Color Map Sensor", filed on Aug. 8, 2016, the disclosure of which is incorporated by reference herein in its entirety.

BACKGROUND

Image quality of digital cameras is driven primarily by the size and number of the pixels in the camera's image sensor. The size of the pixels drive the camera sensitivity, which is a measure of the camera's ability to capture light. Higher sensitivity result in a greater amount of light being captured in a given exposure time, thereby increasing signal-to-noise ratio, which is a measure of image quality. The resolution of the image sensor, which is measured by the number of pixels in combination with optical resolution of the cameras lens, drives the ability of a camera to capture detail.

In modern smart phones and other small devices, industrial design has trended towards thinner form factors, which constrains the height available for the camera. This constraint creates a tension between attainable image quality and smartphone thickness in the region of a camera because the camera's sensor size drives the overall camera height due to lens height being a function of sensor size. This tension typically results in reduced pixel size and camera sensitivity or reduced pixel count and resolution. Reduced pixel size and camera sensitivity decreases lowlight image quality, thus causing images in the light to be noisy, or in longer exposure times, which can result in blurry images due to camera or subject motion. Further, reduced pixel count and resolution can result in lower image detail.

Some incomplete conventional solutions include multi-aperture "array" cameras to address this constraint between attainable image quality and camera thickness. With multiple imagers, additional light can be captured in a given exposure time without increasing height. Use of multiple imagers to attain higher-quality images, however, requires computationally expensive techniques to fuse images from each of the cameras into a single image. Even with these computationally expensive techniques, artifacts can still be present that are noticeable to the naked eye.

This background description is provided for the purpose of generally presenting the context of the disclosure. Unless otherwise indicated herein, material described in this section is neither expressly nor impliedly admitted to be prior art to the present disclosure or the appended claims.

BRIEF DESCRIPTION OF THE DRAWINGS

Techniques and apparatuses for monochrome-color mapping using a monochromatic imager and a color map sensor are described with reference to the following drawings. The same numbers are used throughout the drawings to reference like features and components.

DETAILED DESCRIPTION

Figure 1:
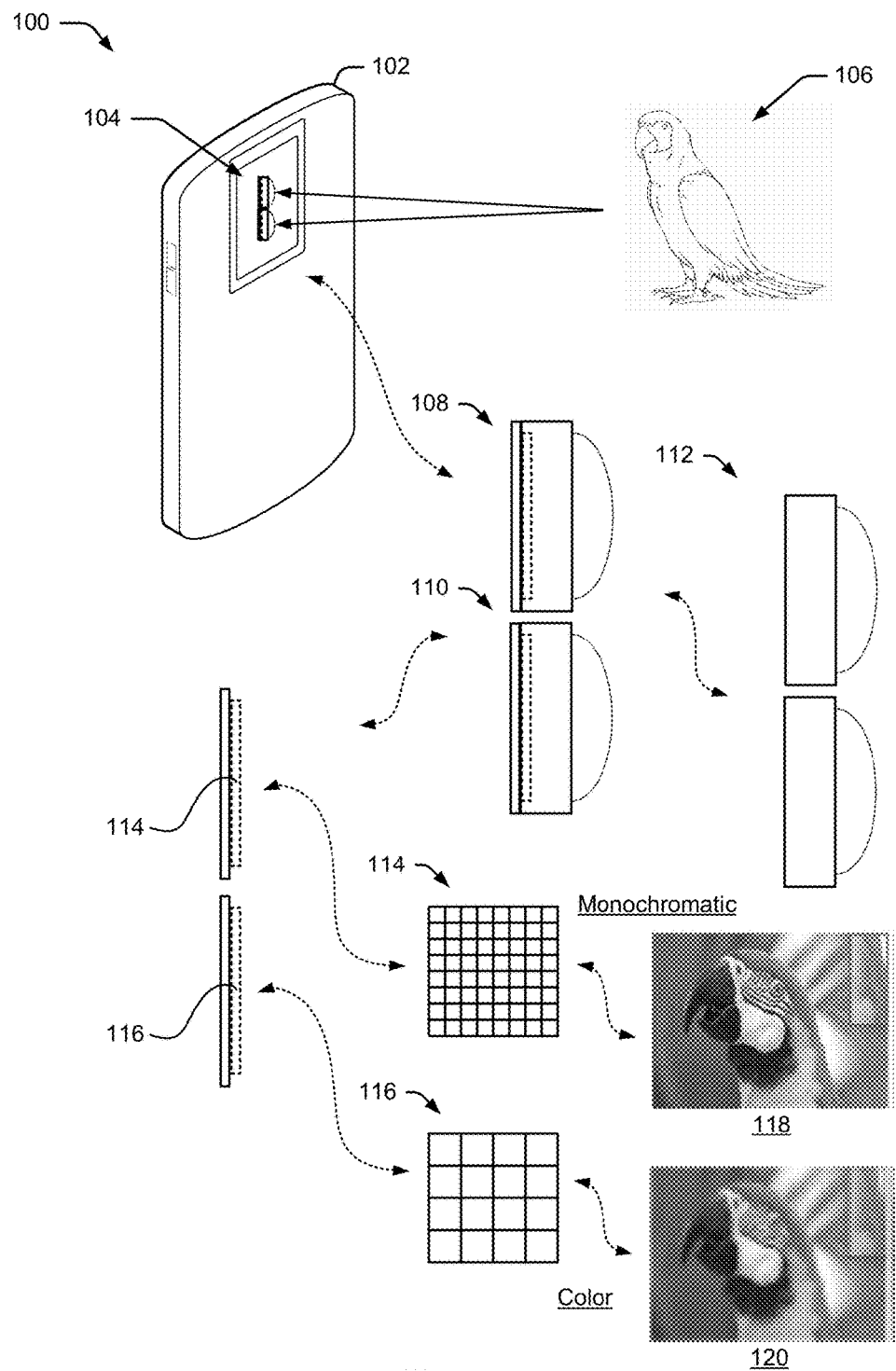
FIG. 1 illustrates an example environment in which monochrome-color mapping using a monochromatic imager and a color map sensor can be enabled.

Conventional sensor arrays use an array of image sensors to realize a final image. These sensor arrays enable a camera to have a low Z-height relative to the quality of the final image. Compared to a single sensor that provides a similar image quality, for example, sensor arrays can be designed have a low Z-height. This is due to a relationship between sensor size and Z height for the lens that focuses the image onto the sensor. Cameras based on sensor arrays use multiple smaller sensors, allowing for shorter z-height, and then combine the outputs of each of the sensors. By so doing, these cameras can create a composite image that is similar in quality to a single larger sensor. This approach can be further enhanced by combining monochrome and color image sensors in an array, since monochrome sensors collect two, three, or more multiples of light than a color sensor of equivalent size. Monochrome sensors also have an advantage in resolution.

Consider, for example, a conventional sensor having a repeating 2×2 grid of pixels, the pixels having red, blue, and two green pixels to capture images. Each, one pixel that senses red, one blue, and two green. The two green are used to determine resolution (e.g., sharpness) in addition to the color green, while the blue and red pixels are used to establish the red and blue components of the scene. Through a computationally expensive interpolation process these pixels are used to reconstruct full resolutions frames of red, green, and blue. However this interpolation can only truly recover detail on the order of 50% the sensor resolution (e.g., 0.5 megapixels for a one megapixel imager).

To maximize this resolution, some conventional sensor arrays use small color pixels to increases a number of pixels in a sensor, and thus keep the size of the sensor down, which in turn keeps the Z-height relatively low. Small color pixels, however, often fail to handle noise well, as each pixel's ability to capture light is limited by size, and thus small pixels have poorer signal-to-noise ratios than large pixels. Conventional sensor arrays often forgo use of large pixels, however, because doing so increases the Z-height or reduces the final resolution of the image.

Furthermore, these conventional sensor arrays require that the images be fused to create a final image. This fusing often requires a pixel-by-pixel combination of the output of each sensor to be is determined. Matching millions of pixels to each other is both computationally expensive and, unfortunately, often fraught with error. These errors are prone to produce visual artifacts in the final image.

Consider instead, however, monochrome-color mapping using a monochromatic imager and a color map sensor. By mapping colors to a monochromatic image rather than pixel-by-pixel fusing, image quality, computational costs, and Z-height may be improved. Furthermore, the monochromatic sensor provides inherently higher resolution and signal to noise than the conventional bayer (color) sensor because it requires no interpolation and collects two or more times the light. A major purpose of the color map sensor is to capture the color palette for the captured image; therefore, its resolution is not particularly important. Fewer, larger pixels can be chosen, thereby improving signal-to-noise and sensitivity of the color map sensor.

The following discussion first describes an operating environment, detailed example of a computing device and array camera, example color and monochrome images and scales, example methods, and follows with a detailed description of an example imaging device.

Example Environment

FIG. 1 illustrates an example environment 100 in which monochrome-color mapping using a monochromatic imager and a color map sensor can be embodied. Example environment 100 includes a computing device 102 in which an array camera 104 captures images of a scene 106. The array camera 104 includes a monochromatic imager 108 and a color map sensor 110. In this embodiment the monochromatic imager 108 and the color map sensor 110 each include a lens stack 112. A Z-height of the lens stack 112 for each depends on the area (perpendicular to the Z axis) of respective pixel sensors, and thus may be larger or smaller in Z-height dependent on the sensor area.

The monochromatic imager 108 also includes a monochromatic pixel sensor 114. Here the monochromatic imager 108 is monochrome with a clear color filter. This monochrome aspect improves signal-to-noise ratio in low-light situations and, as noted, enables a high detail for a given pixel count, though in monochrome (e.g., grayscale). Thus, the monochromatic imager 108, through the monochromatic pixel sensor 114, enables higher detail than a color sensor having a same number of pixels. The monochromatic imager 108 can also perform better in low-light environments due to an improved signal-to-noise ratio (SNR).

In some cases, the monochromatic imager 108 also includes a filter permitting infrared radiation to be sensed by the monochromatic pixel sensor 114. Typically, infrared radiation is not desired for color-pixel sensors because infrared radiation inhibits color fidelity. Here, however, the monochromatic imager 108 is monochrome, and thus this typical limitation is not present. Further, by permitting infrared radiation to be sensed, the bandwidth captured by the imager is expanded into the near Infrared (IR). This also improve SNR in low-light scenes, in some cases so much that the monochromatic imager 108 may capture images in near darkness. IR sensing may, in some cases, permit a faster exposure time as well as better capture of moving objects in a scene, which can be useful for still images and for capture of multiple images in recording a video, especially for high-resolution capture of video. While contemplated, IR is not required for the techniques.

Here the color map sensor 110 is a color-sensitive imager having one of the lens stacks 112 and a color pixel sensor 116. Note that a particular type of imager is not required, as simply capturing colors of the scene is sufficient. These colors need not be in a particular region or zone, or structured such that a location-based, pixel-to-pixel relation be established. As shown, the color map sensor 110 includes color-sensitive pixels, though this can be through use of filters, rather than different sensors. Here three types of colors are sensed by the color map sensor 110 through Bayer color filtering, namely in blue, green, and red, though other combinations of colors can be substituted.

The illustration shows resolutions of the monochromatic pixel sensor 114 and the color pixel sensor 116 in terms of a number and size of squares, which are here assumed to be pixels. While simplified for visual clarity (showing millions of pixels is not possible for this type of illustration), the monochromatic pixel sensor 114 includes four times the number of pixels of the color pixel sensor 116, which in turn include pixels that are four times as large as those of the monochromatic pixel sensor 114. Thus, the monochromatic imager 108 captures a high-resolution, monochromatic image 118 of the scene 106, while the color map sensor 110 captures a lower-resolution, but high fidelity color image 120 (color not shown in illustration). Generally, smaller pixels have less capacity to absorb photons, and thus, they have less capacity to overcome the sensor's noise in low light. Therefore, the larger pixels of the color pixel sensor 116 allow for a better signal-to-noise ratio, which aids in capturing an accurate color representation and for low-light scenes.

Figure 2:
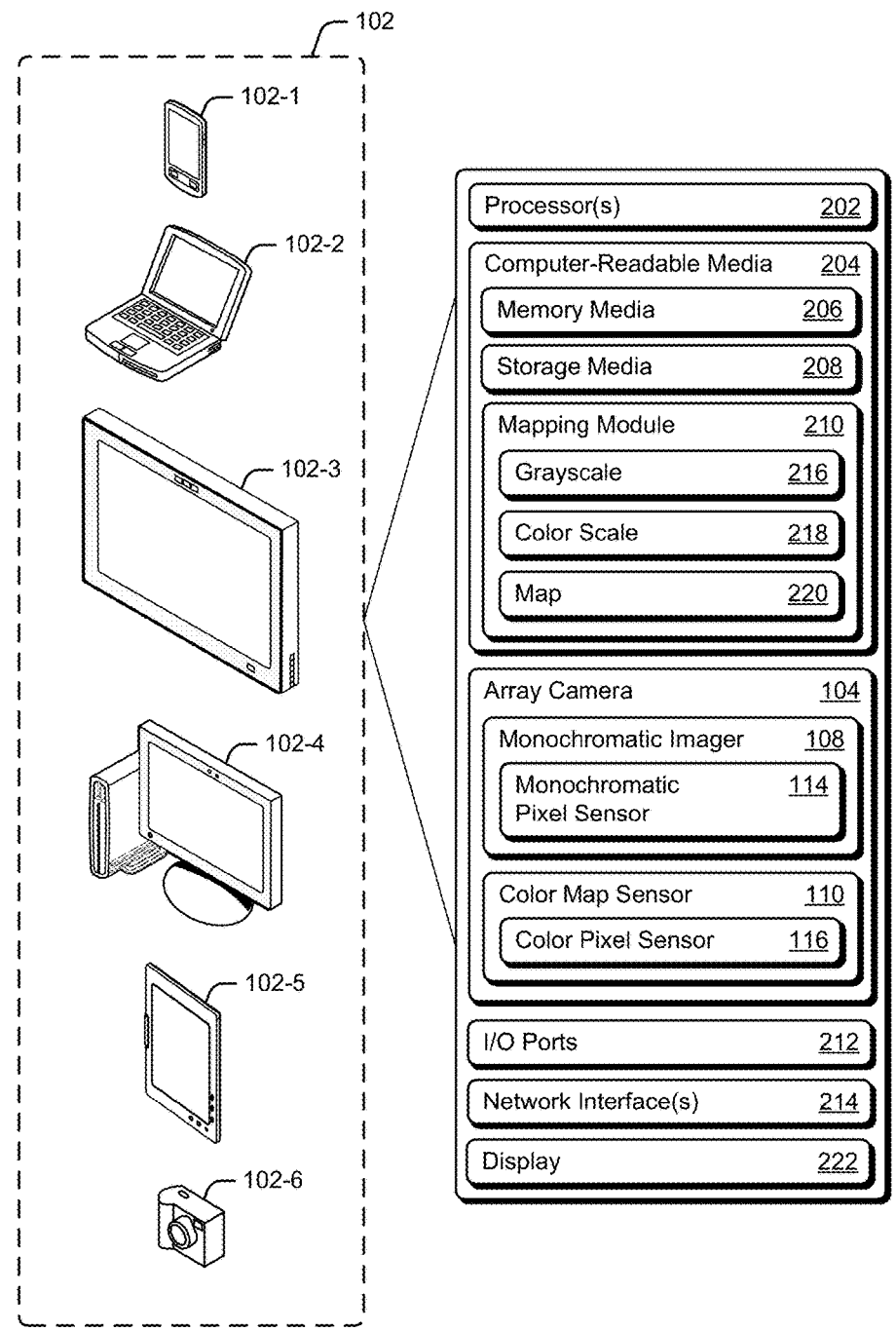
FIG. 2 illustrates a detailed example of the computing device of FIG. 1

Having generally described the monochromatic imager 108 and the color map sensor 110, this discussion now turns to FIG. 2, which illustrates the computing device 102 of FIG. 1 in greater detail. The computing device 102 is illustrated with various non-limiting example devices: smartphone 102-1, laptop 102-2, television 102-3, desktop 102-4, tablet 102-5, and camera 102-6. The computing device 102 includes processor(s) 202 and computer-readable media 204, which includes memory media 206 and storage media 208. Applications and/or an operating system (not shown) embodied as computer-readable instructions on the computer-readable memory 204 can be executed by the processor(s) 202 to provide some or all of the functionalities described herein. The computer-readable media 204 also includes mapping module 210. As noted above, the computing device 102 includes the monochromatic imager 108 and the color map sensor 110, which in turn include the monochromatic pixel sensor 114 and the color pixel sensor 116, respectively. A focusing module or light-balancing module may also be included (not shown), which may provide focus or balance light between the various imagers, through software or hardware or both.

In some cases, the computing device 102 is in communication with, but may not necessarily include, the array camera 104 or elements thereof. Captured images are instead received by the computing device 102 from the array camera 104 via the one or more I/O ports 212. The I/O ports 212 can include a variety of ports, such as by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports. The computing device 102 may also include network interface(s) 214 for communicating data over wired, wireless, or optical networks. By way of example and not limitation, network interface 214 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

In more detail, the mapping module 210 is capable of monochrome-color mapping to produce a high-resolution color image by colorizing a high-resolution monochromatic image with colors captured of the scene. As shown in FIG. 2, the mapping module 210 includes or has access to a grayscale 216 and a color scale 218. With the grayscale 216 and the color scale 218, the mapping module 210 maps the grayscale 216 to the color scale 218 to produce a map 220.

Figure 3:
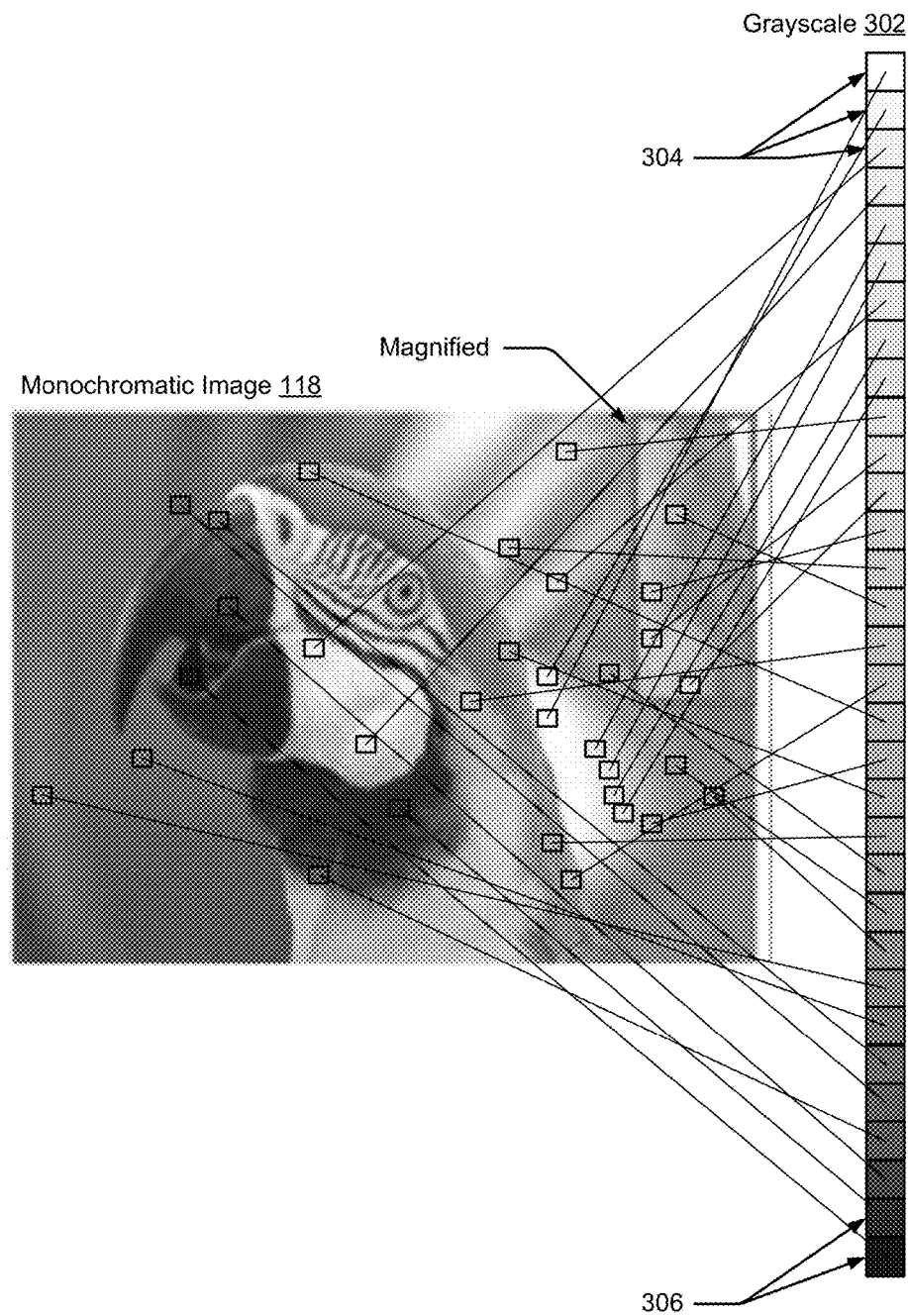
FIG. 3 illustrates an example monochromatic image of FIG. 1 along with an example grayscale.
Figure 4:
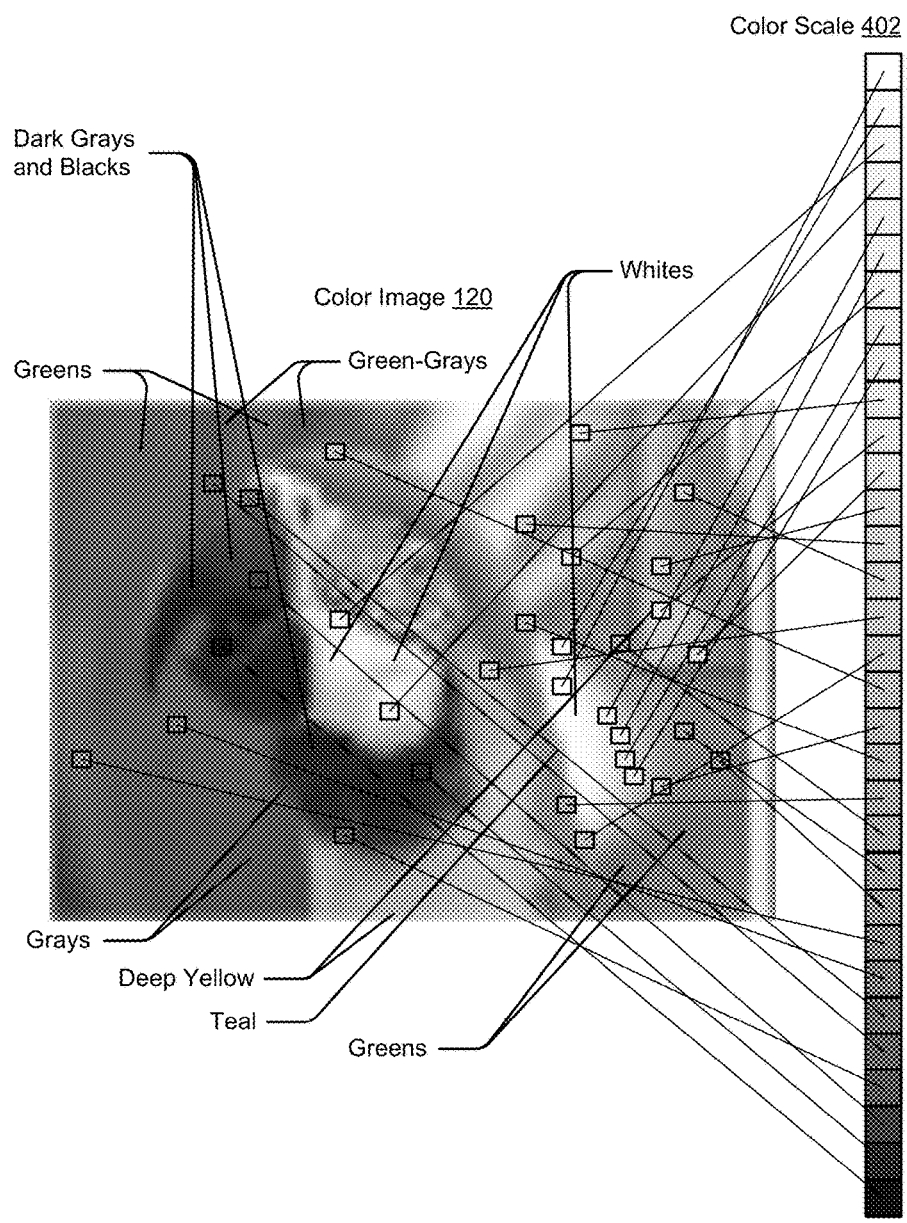
FIG. 4 illustrates an example color image of FIG. 1 along with an example color scale.

By way of illustration, consider FIGS. 3 and 4. FIG. 3 shows an example grayscale 302 determined from the monochromatic image 118 shown in FIG. 1. As noted above, the mapping module 210 determines, based on a high-resolution monochromatic image of the scene (e.g., the monochromatic image 118), a grayscale, such as grayscale 302.

This grayscale 302 is simplified to show only 32 shades of gray, though an actual number can be as high as millions of different shades, the 32 shades shown for visual brevity. Note that a grayscale need not, and often is not, linear. Some images are fairly dark, and so may have a relatively small number of high-luminosity samples (e.g., whites, shown at white samples 304) and a large number of low-luminosity samples (e.g., blacks and dark grays, shown at dark samples 306). Thus, assume that one million luminosities are sensed for a monochromatic imager for a scene—800,000 of these may be fairly light, and only 200,000 dark, or the reverse, or most may be centered in the middle of the scale. The grayscales used are dictated by the luminosities of the pixels of the monochromatic imager, and thus may scale to those captured luminosities. To see additional detail, note a magnified window showing greater detail of feathers of the parrot.

Likewise, FIG. 4 shows an example of a color scale 402 determined from the color image 120 shown in FIG. 1 (all shown without color, but with color labeled). The mapping module 210 determines, based on colors of a scene, such as colors of the color image 120 of the scene 106, a color scale for the scene, here at the color scale 402. The color scale 402 potentially has one fourth of the number of the grayscale 302 due to monochromatic image 118 having four times the number of pixels as that of the color image 120. Mapping one to the other may therefore require downscaling the greyscale to the color scale. Here the color scale 402 is also shown with 32 colors, though the actual number can be in the thousands or millions.

A coarse alignment of the color image with the monochrome image provides the required cues to establish which color corresponds to a given grayscale value. While colorization of a black and white image is possible with no color cues, it is a synthesis of the scenes' color based on assumptions rather than the true color map of the scene. The proposed techniques remove this ambiguity by capturing the color palette of the image at the same time as the monochrome image.

One strength of the color-mapping techniques is that the colors in the color scale are of the actual scene—this aids in accurately mapping colors to grayscale, as the number of possible colors is not unlimited, but instead includes the colors of the scene, not other scenes or all possible colors. As labeled in the color image 120, the colors include various shades of white, shades of green, a few shades of teal, a medium and deep yellows with a hint of orange. There are also grays and green-grays, as well as dark grays and blacks. There are many colors in the spectrum that are not included in the color image 120—dark orange, purple, red, most blues, pinks, and so forth. Because of this, mapping the colors to the greyscales can be accurate. Note that the sampling locations in the images of FIGS. 3 and 4 are shown at some but not all locations on the image—this is for visual brevity—the colors can be sampled at different locations from those shown for the grayscale 302 or for all locations in the color image 120.

Figure 5:
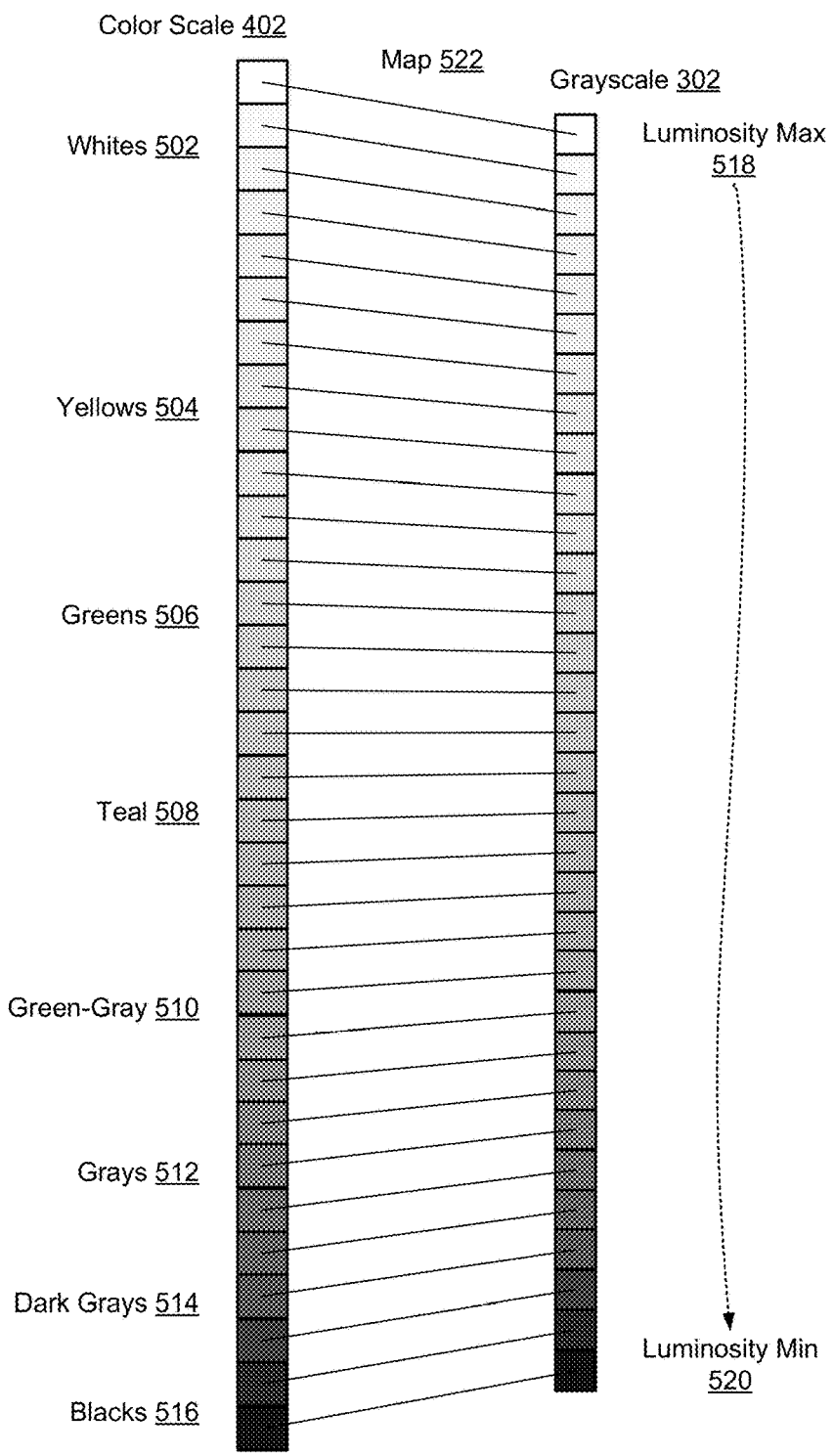
FIG. 5 illustrates an example map of the greyscale of FIG. 3 and the color scale of FIG. 4.

For the resulting colors in the scene, see FIG. 5, which illustrates the colors of the color scale 402, in detail. The colors shown include whites 502, yellows 504, greens 506, teals 508, green-grays 510, grays 512, dark grays 514, and blacks 516. Compare these colors to the grayscale 302, which ranges from a luminosity maximum 518 to a luminosity minimum 520. Note that the colors can be represented as a luminosity, and thus the luminosities of both scales mapped based on luminosities, though the relationship is unlikely to be linear. While the illustration shows a one-to-one mapping at map 522, the grayscale 302 is not equal to a color range of the luminosities in the color scale 402. To address this, the mapping module can adjust the greyscale or the color scale. This adjustment can be through light balancing, be linear, or be non-linear. The luminosities of a grayscale will often be higher overall than those of the color scale, and thus balancing may move most or all of the luminosities of the color scale higher. The higher luminosities of the grayscale are due to use of a clear filter—with no bandwidth of color being filtered, luminosities are often higher.

Returning to FIGS. 1 and 2, consider again the array camera 104. The array camera 104 need not have separate imagers. Instead, the monochromatic imager and the color map sensor can be integrated into a single imager. For example, the single imager can have a relatively small number of color pixels interspersed throughout the monochromatic imager. This can save some production costs, though use may reduce some of the Z-height advantages noted above. Mapping the colors to the grayscale can benefit, in some cases, from this single-imager design, as the color captured at a location can be easily, with low computational costs, correlated to neighboring monochromatic pixels. This single imager can also be combined with other, color map sensors, with the color pixels in the predominantly monochromatic imager used instead to make the mapping of the colors from the color sensor to the grayscale more accurate, as the dispersed color pixels in the monochromatic pixels can be easily correlated.

Figure 6:
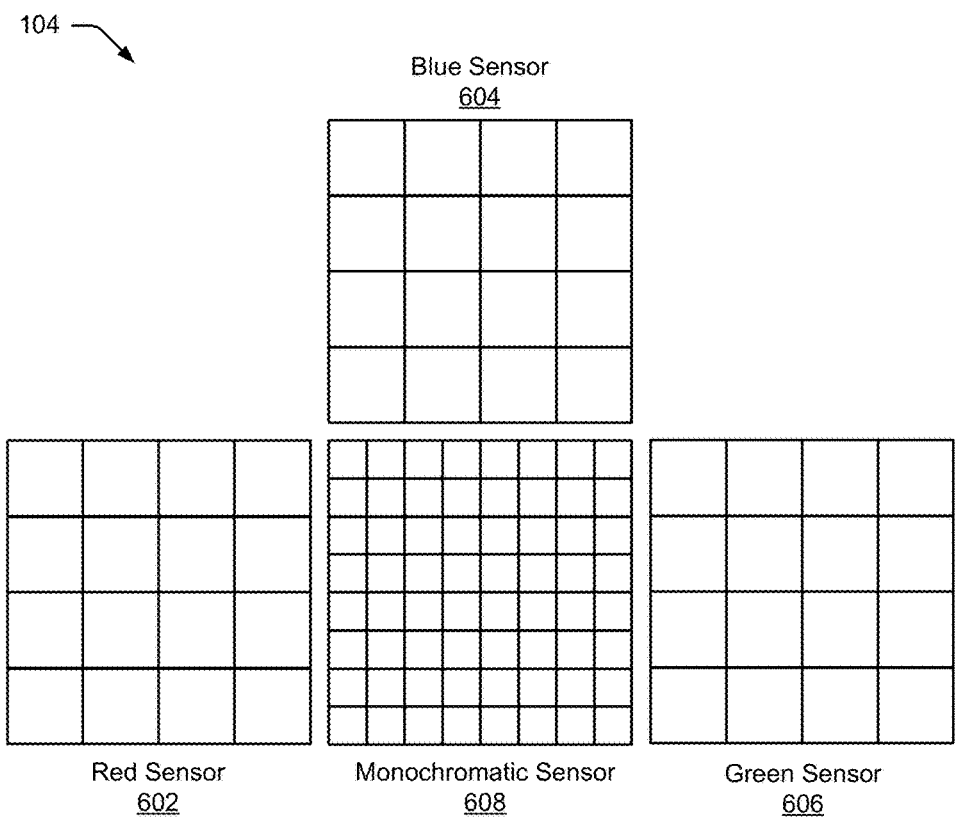
FIG. 6 illustrates an example of the array camera of FIG. 1 with three color sensors.

Another alternative for the array camera 104 includes use of multiple color pixel sensors 116. Thus, three separate sensors can be used, one each for three colors, such as red, green, blue, or magenta, yellow, cyan, or other combinations known in the art. This is illustrated in FIG. 6, with red sensor 602, blue sensor 604, green sensor 606, and monochromatic sensor 608. Note that each of these color sensors can be as large as the monochromatic sensor 608 without requiring additional Z-height, and with larger pixels for the various advantages noted above. In such a case, the color map sensor 110, and the mapping module 210, can combine the colors from the three sensors into a color scale.

Example Methods

The following discussion describes methods by which techniques are implemented to enable monochromatic-color mapping using a monochrome imager and a color map sensor. These methods can be implemented utilizing the previously described environment and example sensor arrays and imagers, such as shown in FIGS. 1-6. The orders in which operations of these methods are shown and/or described are not intended to be construed as a limitation, and any number or combination of the described method operations can be combined in any order to implement a method, or an alternate method.

Figure 7:
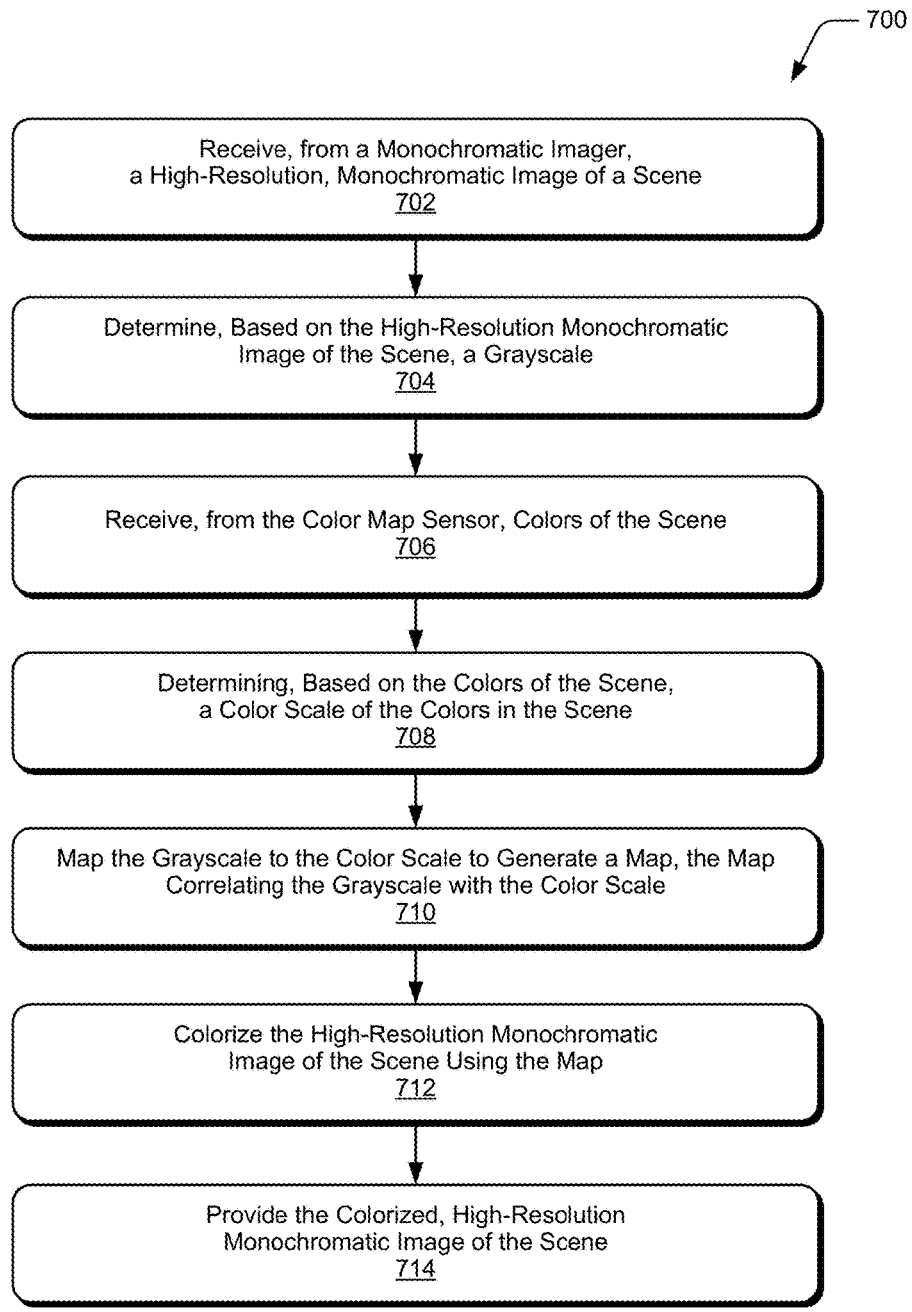
FIG. 7 illustrates an example method for monochrome-color mapping.
Figure 9:
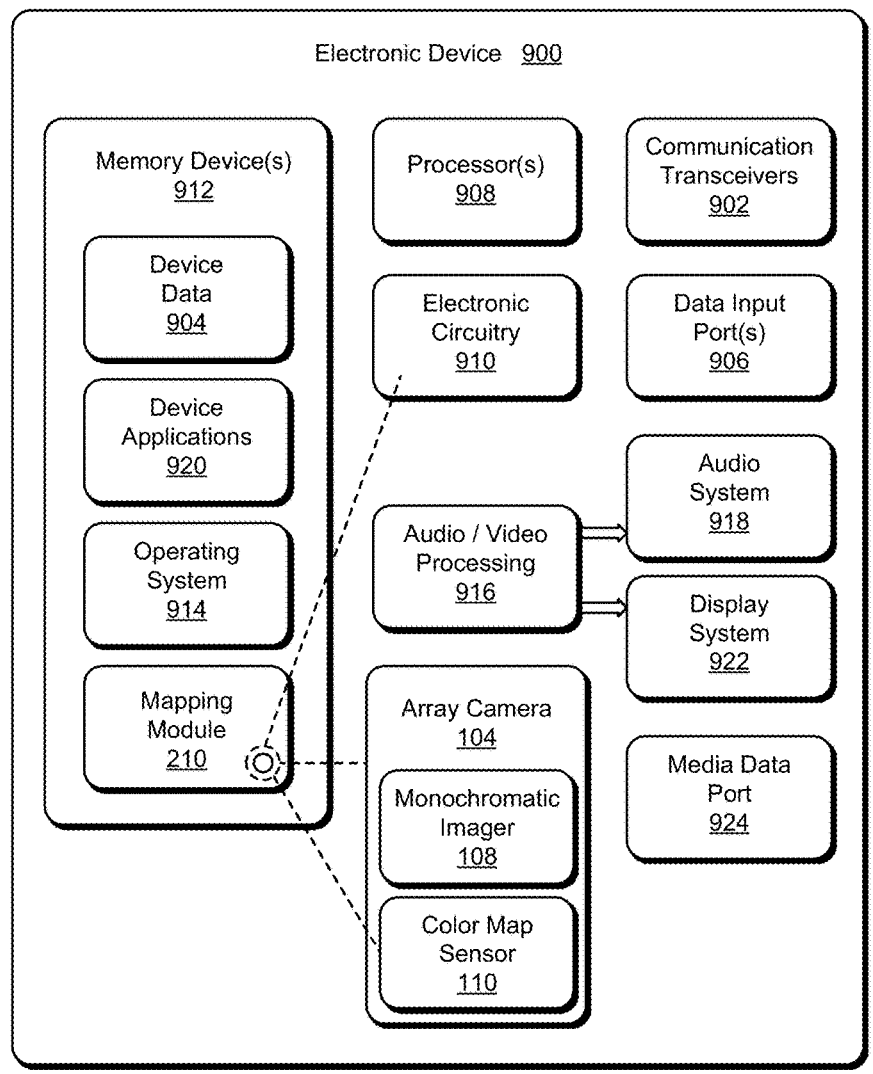
FIG. 9 illustrates various components of an electronic device that can implement a monochrome-color mapping using a monochromatic imager and a color map sensor in accordance with one or more embodiments.

Consider FIG. 7, which illustrates an example method 700, operations of which can be performed by elements of FIGS. 2 and 9, such as the mapping module 210. At 702, a high-resolution, monochromatic image of a scene is received from a monochromatic imager. As noted above, this image can be from an imager having a relatively high resolution, such as monochromatic image 118 of FIGS. 1 and 3. This high resolution can be higher than an image from which a color scale is determined, though this is not required. Further, this high-resolution monochromatic image is not required to be from a single imager, though computational costs to combine monochromatic images can be a deterrent to doing so.

At 704, a grayscale is determined based on the high-resolution monochromatic image of the scene. As noted, the grayscale can be a scale of luminosities from the monochromatic image, though a linear scale is unlikely. The grayscale image may include hundreds to thousands of luminosities.

At 706, colors of the scene are received from a color map sensor. As noted, this can be through pixels integrated into a mostly high-resolution monochromatic sensor, a separate sensor, multiple sensors, and so forth. An exact image, or image correlation to the high-resolution image is not required. These colors of the scene can be captured simultaneously or in rapid succession before or after the monochromatic image. Thus, if for power or computational reasons capture in rapid succession is desirable, the techniques permit this, as perfect matching of the color and monochromatic images are not required.

At 708, a color scale of the colors in the scene is determined based on the colors of the scene. As noted in the examples of FIGS. 1 and 4, the colors of the scene can be determined by one or more color images taken of the scene, though this is not required—only colors, even if they are not at a proper location or accurate resolution of the scene, are permitted.

At 710, the color is mapped to the grayscale scale to generate a map correlating the appropriate color value with each grayscale value. This mapping of the grayscale to the color scale can correlate luminosities in the grayscale with luminosities in the color scale. In some cases the grayscale and the color scale are linear scales of luminosities, the grayscale representing luminosities in gray, and the color scale representing a combination of luminosities captured in red, green, and blue. In other cases, the scales are not linear, as some luminosities (color or monochrome) are more highly or unevenly represented.

At 712, the high-resolution monochromatic image of the scene is colorized using the map. A simplified map of colors to monochrome is shown in FIG. 5, though as noted, the mapping can be more complex and will often involve many samples, rather than the 32 shown in FIG. 5.

Unlike many conventional techniques, mapping the color and monochrome scales, and colorizing to produce the final image, can be performed without many computational tasks, such as demosaicing, which are common to conventional image processing. In contrast to conventional techniques using an array camera, a pixel-to-pixel, location-based matching is not used, saving substantial computational costs, as well are providing an oft-superior final image.

At 714, a colorized, high-resolution monochromatic image of the scene is provided. This is often displayed quickly following the capture, such as by rendering on display 222 of the computing device 102 of FIG. 2.

Figure 8:
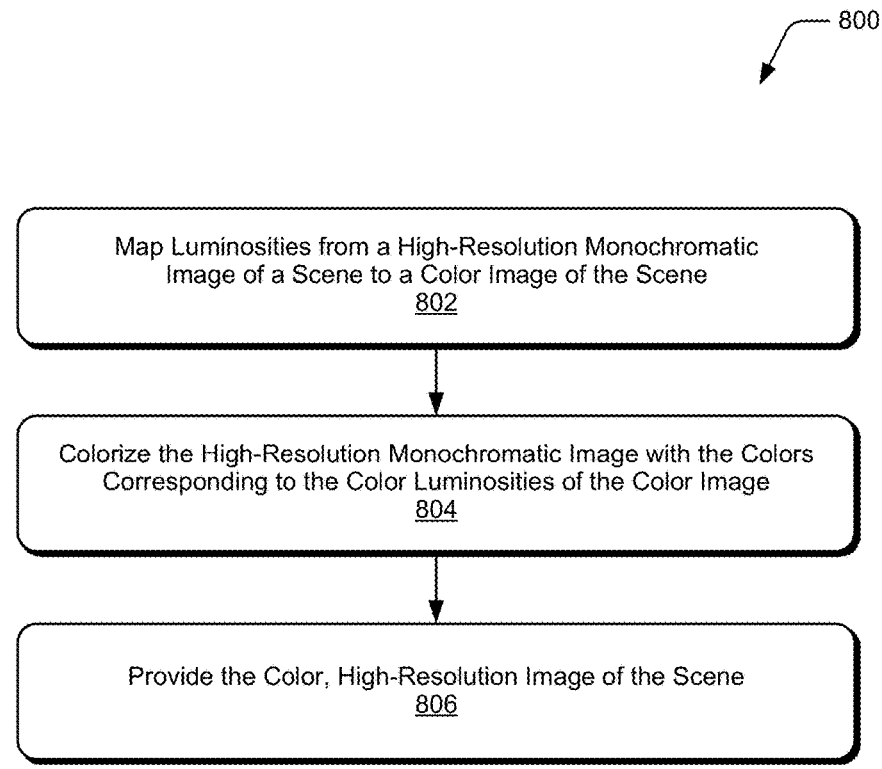
FIG. 8 illustrates another example method for monochrome-color mapping.

Consider also FIG. 8, which illustrates an example method 800, operations of which can be performed by elements of FIGS. 2 and 9, such as the mapping module 210. Methods 700 and 800 may operate alone or in conjunction, in whole or in part.

At 802, monochrome luminosities from a high-resolution monochromatic image of a scene are mapped to color luminosities corresponding to colors from a color image of the scene. The high-resolution monochromatic image and the color image of the scene can be captured simultaneously, in rapid succession, or at a disparate time. As noted, the map correlates the monochrome luminosities in the high-resolution monochromatic image to the color luminosities corresponding to colors from the color image of the scene, though the exact same scene or capture of the scene is not required.

As noted in part above, a range of the luminosities of the high-resolution monochromatic image may not be equal to a range of the luminosities in the color image. In such a case, mapping the monochrome luminosities to the color luminosities comprises adjusting one of the ranges or one of the ranges can be light balanced. The scales may have a different number of samples, in such a case the mapping correlates multiples of one scale to a single luminosity of the other scale (e.g., multiple monochrome luminosities in the high-resolution monochromatic image to a single color from the color image of the scene).

While not always the case, the color image of the scene can be captured at a disparate time with the monochromatic image. Consider, for example, an image captured fairly late at twilight or on a gray, cloudy day of a commonly imaged scene (a famous building, commonly imaged mountain, a famous garden, or a person often imaged by others or simply by the user taking the image). A color map from a same or similar scene can be used, either after asking a user if they want the colors of the image to be altered/improved, or based on the color map for a color image captured simultaneously being of poor color or color fidelity.

Further, consider a case where a user takes many pictures rapidly, such as through video capture, taking five or ten images over a minute of a same person or scene, or through a combination (some cameras take a short video snip and then the final image). Colors from an image taken five seconds before an image chosen by the user can be used for the color map, alone or in combination with the simultaneous color image. If a user takes a picture of a child and the child's eyes are partially close, for example, and then quickly thereafter another where the child's eyes are open, but the color fidelity is not as good as the prior picture with the partially close eyes, the color from the prior picture can be used to colorize the later monochromatic image where the child's eyes are open.

At 804, using the map, the high-resolution monochromatic image of the scene is colorized with the colors corresponding to the color luminosities of the color image of the scene. In some cases, the mapping module 210 colorizes pixel or pixel regions of the high-resolution monochromatic image of the scene with a respective color of the colors from the color image of the scene. This can be region-by-region or pixel-by-pixel, such as setting each gray luminosity to a particular color and then colorizing the monochromatic image at pixels with those gray luminosities, and so forth through each gray luminosity present in the monochromatic image.

At 806, the color, high-resolution image of the scene is provided, such as to a display of a computing device by which the image was captured.

Example Electronic Device

FIG. 9 illustrates various components of an example electronic device 900 that can be implemented as an imaging device as described with reference to any of the previous FIGS. 1-8. The electronic device may be implemented as any one or combination of a fixed or mobile device, in any form of a consumer, computer, portable, user, communication, phone, navigation, gaming, audio, camera, messaging, media playback, and/or other type of electronic device, such as array camera 104 described with reference to FIGS. 1, 2, and 6.

Electronic device 900 includes communication transceivers 902 that enable wired and/or wireless communication of device data 904, such as received data, transmitted data, or sensor data as described above. Example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

The electronic device 900 may also include one or more data input ports 906 via which any type of data, media content, and/or inputs can be received, such as user-selectable inputs, messages, music, television content, recorded video content, and any other type of audio, video, and/or image data received from any content and/or data source (e.g., other image devices or imagers). The data input ports 906 may include USB ports, coaxial cable ports, and other serial or parallel connectors (including internal connectors) for flash memory, DVDs, CDs, and the like. These data input ports may be used to couple the electronic device to components (e.g., array camera 104), peripherals, or accessories such as keyboards, microphones, or cameras.

The electronic device 900 of this example includes processor system 908 (e.g., any of application processors, microprocessors, digital-signal-processors, controllers, and the like), or a processor and memory system (e.g., implemented in a SoC), which process (i.e., execute) computer-executable instructions to control operation of the device. The system processors 908 (processor(s) 908) may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware.

Alternatively or in addition, the electronic device 900 can be implemented with any one or combination of electronic circuitry, which may include software, hardware, firmware, or fixed logic circuitry that is implemented in connection with processing and control circuits, which are generally identified at 910 (electronic circuitry 910). This electronic circuitry 910 can implement the mapping module 210, as noted through processing instructions on computer-readable media, through logic circuitry and/or hardware, such as a field-programmable gate array (FPGA), and so forth. Hardware-only devices in which monochrome-color mapping using a monochromatic imager and a color map sensor may be embodied include those that colorize, without computer processors, color luminosities based on greyscale luminosities via voltage signals.

Although not shown, the electronic device 900 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 900 also includes one or more memory devices 912 that enable data storage, examples of which include random access memory (RAM), non-volatile memory (e.g., read-only memory (ROM), flash memory, EPROM, EEPROM, etc.), and a disk storage device. The memory device(s) 912 provide data storage mechanisms to store the device data 904, other types of information and/or data, and various device applications 920 (e.g., software applications). For example, the operating system 914 can be maintained as software instructions within the memory device 912 and executed by the processors 908. In some aspects, the mapping module 210 is embodied in the memory devices 912 of the electronic device 900 as executable instructions or code. Although represented as a software implementation, the mapping module 210 may be implemented as any form of a control application, software application, electronic circuitry module, or hardware or firmware installed on the array camera 104.

The electronic device 900 also includes audio and/or video processing system 916 that processes audio data and/or passes through the audio and video data to audio system 918 and/or to display system 922 (e.g., a screen of a smart phone or camera). The audio system 918 and/or the display system 922 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 924. In some implementations, the audio system 918 and/or the display system 922 are external components to the electronic device 900. Alternatively or additionally, the display system 922 can be an integrated component of the example electronic device, such as part of an integrated touch interface. The electronic device 900 includes, or has access to, the array camera 104, which includes the monochromatic imager and the color map sensor 110. Sensor data is received from the array camera 104 by the mapping module 210, here shown stored in the memory devices 912, which when executed by the processor 908 constructs a final image as noted above.

Although embodiments of monochrome-color mapping using a monochromatic imager and a color map sensor have been described in language specific to features and/or methods, the subject of the appended claims is not necessarily limited to the specific features or methods described. Rather, the specific features and methods are disclosed as example implementations for monochrome-color mapping using a monochromatic imager and a color map sensor.

What is claimed is:

1. A method for providing a color, high-resolution image of a scene comprising:
    capturing a high-resolution monochromatic image of the scene;
    capturing a low-resolution color image of the same scene, a resolution of the captured low-resolution color image being lower than a resolution of the captured high-resolution monochromatic image;
    mapping, using a nonlinear grayscale that is downscaled to a color scale based on a number of pixels of the captured high-resolution monochromatic image of the scene and another number of pixels of the captured low-resolution color image of the same scene, monochrome luminosities from the captured high-resolution monochromatic image to color luminosities corresponding to colors from the captured low-resolution color image of the scene to produce a map, the map correlating the monochrome luminosities in the captured high-resolution monochromatic image to the color luminosities corresponding to colors from the captured low-resolution color image of the scene;

using the map, colorizing the captured high-resolution monochromatic image of the scene with the colors corresponding to the color luminosities of the captured low-resolution color image of the scene, the colorizing providing a color, high-resolution image of the scene; and providing the color, high-resolution image of the scene.

2. The method of claim 1, wherein using the map to colorize the captured high-resolution monochromatic image of the scene colorizes pixel or pixel regions of the captured high-resolution monochromatic image of the scene with a respective color of the colors from the captured low-resolution color image of the scene.

3. The method of claim 1, wherein mapping the monochrome luminosities to the color luminosities comprises adjusting one of the ranges.

4. The method of claim 3, wherein adjusting one of the ranges light balances the captured low-resolution color image or the captured high-resolution monochromatic image one to another.

5. The method of claim 1, wherein the captured high-resolution monochromatic image and the captured low-resolution color image are captured at disparate times.

6. The method of claim 1, wherein the nonlinear gray scale is determined from the captured high-resolution monochromatic image.

7. The method of claim 1, wherein capturing the high-resolution monochromatic image of the scene includes capturing infrared radiation, the capturing of the infrared radiation effective to improve performance of the monochromatic imager through an improved signal-to-noise ratio.

8. The method of claim 7, wherein the improved signal-to-noise ratio enables the monochromatic imager to capture the monochromatic image of the scene in near darkness.

9. A computing device comprising:
a monochromatic imager;
a color map sensor;
electronic circuitry that implements a mapping module, the mapping module capable of performing operations comprising:
receiving, from the monochromatic imager, a high-resolution, monochromatic image of a scene;
determining, from the high-resolution monochromatic image of the scene, a nonlinear grayscale, the nonlinear gray scale having a larger number of low-luminosity samples relative to a number of high-luminosity samples, where luminosities of the larger number of high-luminosity samples are higher than luminosities of the number of low-luminosity samples;
receiving, from the color map sensor, a low-resolution color image of the same scene, a resolution of the captured low-resolution color image being lower than a resolution of the captured high-resolution monochromatic image;
determining, from colors of the low-resolution color image, a color scale;

mapping the nonlinear grayscale to the color scale to generate a map, the map correlating the grayscale with the color scale; and
colorizing the high-resolution monochromatic image of the scene using the map.

10. The computing device of claim 9, wherein mapping the grayscale to the color scale correlates luminosities in the nonlinear grayscale with luminosities in the color scale.

11. The computing device of claim 10, wherein a grayscale range of the luminosities in the nonlinear grayscale is not equal to a color range of the luminosities in the color scale, and the matching adjusts the greyscale range or the color range.

12. The computing device of claim 9, wherein the monochromatic imager and the color map sensor are integrated into a single imager.

13. The computing device of claim 12, wherein the single imager has a relatively small number of color pixels interspersed throughout the monochromatic imager.

14. The computing device of claim 9, wherein the color imager has an array of color pixels, the color pixels being larger than monochrome pixels of the monochromatic imager.

15. The computing device of claim 9, wherein the color map sensor is a first color map sensor and the colors of the scene are first colors of the scene, and further comprising a second color map sensor, and a third color map sensor, the second color map sensor capturing second colors of the scene, and a third color map sensor capturing third colors of the scene, and wherein mapping the grayscale to the color scale maps the grayscale to each of the first, second, and third colors of the scene.

16. The computing device of claim 9, wherein the high-resolution monochromatic image of the scene and the low-resolution color image of the scene are captured simultaneously.

17. The computing device of claim 9, wherein the monochromatic imager includes a filter that permits infrared radiation to be sensed by a monochromatic pixel sensor of the monochromatic imager, improving performance of the monochromatic imager through an improved signal-to-noise ratio.

18. One or more non-transitory computer-readable storage media having instructions stored thereon that, responsive to execution by one or more computer processors, performs operations comprising:
receiving a high-resolution monochromatic image of a scene, the high-resolution monochromatic image of the scene taken at a first time;
receiving a low-resolution color image, the low-resolution color image of the same scene taken at a second time, the second time not equal to the first time, and a resolution of the low-resolution color image being lower than a resolution of the captured high-resolution monochromatic image;
mapping, using a nonlinear grayscale that is downscaled to a color scale based on a number of pixels of the captured high-resolution monochromatic image of the scene and another number of pixels of the captured low-resolution color image of the same scene, monochrome luminosities from the high-resolution monochromatic image of the scene to color luminosities corresponding to colors from the low-resolution color image to produce a map, the map correlating the monochrome luminosities in the high-resolution monochromatic image to the color luminosities corresponding to colors from the color image;

using the map, colorizing the high-resolution monochromatic image of the scene with the colors corresponding to the color luminosities of the color image, the coloring providing a color, high-resolution image of the scene; and providing the color, high-resolution image of the scene.

19. The non-transitory computer-readable storage media of claim 18, wherein the instructions further perform operations comprising:

receiving a second color image, the second color image captured simultaneously with capture of the high-resolution monochromatic image, the second color image being of the scene and not of a similar scene, and wherein mapping the monochrome luminosities maps the monochrome luminosities to the color luminosities corresponding to colors from the color image and to second color luminosities corresponding to second colors from the second image.

20. The non-transitory computer-readable storage media of claim 18, wherein receiving a high-resolution monochromatic image of a scene includes receiving infrared radiation, the receiving of the infrared radiation effective to improve performance of the monochromatic imager through an improved signal-to-noise ratio.

* * * * *